(12) United States Patent
Kabulepa et al.

(10) Patent No.: US 8,352,809 B2
(45) Date of Patent: Jan. 8, 2013

(54) CHECKING METHOD AND ELECTRONIC CIRCUIT FOR THE SECURE SERIAL TRANSMISSION OF DATA

(75) Inventors: Lukusa Didier Kabulepa, Erzhausen (DE); Adrian Traskov, Steinbach (DE)

(73) Assignee: Continental Teves AG & Co. oHG (DE)

( * ) Notice: Subject to any disclaimer, the term of this patent is extended or adjusted under 35 U.S.C. 154(b) by 96 days.

(21) Appl. No.: 12/665,821

(22) PCT Filed: May 15, 2008

(86) PCT No.: PCT/EP2008/055934
§ 371 (c)(1),
(2), (4) Date: Dec. 21, 2009

(87) PCT Pub. No.: WO2009/000597
PCT Pub. Date: Dec. 31, 2008

(65) Prior Publication Data
US 2010/0192051 A1   Jul. 29, 2010

(30) Foreign Application Priority Data
Jun. 22, 2007   (DE) .......................... 10 2007 028 766

(51) Int. Cl.
*G06F 11/00* (2006.01)
(52) U.S. Cl. ....................................................... 714/703
(58) Field of Classification Search .................. None
See application file for complete search history.

(56) References Cited

U.S. PATENT DOCUMENTS

| | | | | |
|---|---|---|---|---|
| 3,786,415 A | * | 1/1974 | Phillips et al. ................. | 714/798 |
| 4,669,081 A | * | 5/1987 | Mathewes et al. ............. | 714/703 |
| 4,701,923 A | * | 10/1987 | Fukasawa et al. ............. | 714/774 |
| 4,809,273 A | * | 2/1989 | Jackowski et al. ............. | 714/703 |
| 4,903,270 A | * | 2/1990 | Johnson et al. ............... | 714/820 |
| 5,001,712 A | | 3/1991 | Splett et al. | |
| 5,757,811 A | * | 5/1998 | Kenmoku et al. ............. | 714/703 |
| 5,872,910 A | * | 2/1999 | Kuslak et al. ................... | 714/41 |

(Continued)

FOREIGN PATENT DOCUMENTS

DE   3335397 A1   4/1985
(Continued)

OTHER PUBLICATIONS

Feldmeier, D.C.; , "Fast software implementation of error detection codes," Networking, IEEE/ACM Transactions on , vol. 3, No. 6, pp. 640-651, Dec. 1995.*
Mei-Chen Hsueh; Tsai, T.K.; Iyer, R.K.; , "Fault injection techniques and tools," Computer , vol. 30, No. 4, pp. 75-82, Apr. 1997.*

*Primary Examiner* — Steve Nguyen
(74) *Attorney, Agent, or Firm* — RatnerPrestia (57) ABSTRACT

A checking method in which serial data protected by check data are transmitted via a serial data bus from a transmitter to a receiver, the receiver then conditions the data and compares them with the transmitted check data in order to recognize transmission errors, wherein the transmitter bases the production of the check data and the receiver bases the conditioning of the data on the same check data formation method, wherein the check data formation/conditioning is performed using error recognition hardware, wherein the region of the receiver contains not only the error recognition hardware but also error recognition software which are used to additionally check the received data, and wherein also an error in the transmitted data and/or check data is caused by a transmitter-end error stimulation. A transmission and reception circuit for carrying out the above method and also the use thereof is also disclosed.

8 Claims, 7 Drawing Sheets

U.S. PATENT DOCUMENTS

| | | | |
|---|---|---|---|
| 6,487,686 B1 * | 11/2002 | Yamazaki et al. | 714/703 |
| 6,799,287 B1 * | 9/2004 | Sharma et al. | 714/703 |
| 7,263,647 B2 * | 8/2007 | Bryant et al. | 714/758 |
| 7,321,996 B1 * | 1/2008 | Draper et al. | 714/703 |
| 7,590,930 B2 * | 9/2009 | Kounavis | 714/807 |
| 2006/0101317 A1 | 5/2006 | Uemura et al. | |

FOREIGN PATENT DOCUMENTS

| | | |
|---|---|---|
| DE | 4130907 A1 | 3/1993 |
| EP | 1763168 A1 | 3/2007 |
| EP | 1916794 A2 | 4/2008 |
| WO | WO 2006058050 A1 | 6/2006 |

* cited by examiner

Fig. 8

CHECKING METHOD AND ELECTRONIC CIRCUIT FOR THE SECURE SERIAL TRANSMISSION OF DATA

CROSS REFERENCE TO RELATED APPLICATIONS

This application is the U.S. national phase application of PCT International Application No. PCT/EP2008/055934, filed May 15, 2008, which claims priority to German Patent Application No. 10 2007 028 766.8, filed Jun. 22, 2007, the content of such applications being incorporated by reference herein.

BACKGROUND OF THE INVENTION

1. Field of the Invention

The invention relates to a checking method in which serial data protected by means of check data are transmitted via a serial data bus from a transmitter to a receiver, to an electronic transmission or reception circuit or to a transceiver, which comprises a transmitter and a receiver having serial data transmission means and to the use thereof.

2. Description of the Related Art

Serial bus systems, such as "Controller Area Network" (CAN), Flexray(R) or "Serial Peripheral Interface" (SPI), are already used in motor vehicle electronics for the purpose of networking electronic controllers or micro-controllers. A common feature of these serial bus systems is that the data to be transmitted are split into data telegrams (frames). Each data telegram has a CRC (Cyclic Redundancy Check) checksum, calculated on the basis of a generator polynomial, appended to it. The CRC check on data is known per se, inter alia from DE 41 30 907 A1, EP 1 763 168 A1, DE 33 35 397 A1 or WO 2006/058050 A2.

WO 2006/058050 A2 discloses a CRC error recognition system in which CRC data (CRC corrupters) are manipulated. The manipulation is performed in order to produce a particular synchronization condition or to transmit particular status information to the receiver. This has the disadvantage that the CRC check is not active at least when some data packets are transmitted. The security of the transmission is therefore reduced. A further drawback is that an actual error in the CRC data can, in principle, trigger an unwanted synchronization event.

The means for producing the CRC check data are known to be generally implemented as hardware means. The result of protecting the data using conventional CRC check data is that one hundred percent data protection is not attained. The residual error that remains can be calculated or estimated for a prescribed length of data telegrams either analytically or by means of simulations.

EP 1 763 168 A1, already mentioned further above, proposes reducing the residual error by forming a second CRC protection attachment.

SUMMARY OF THE INVENTION

An object of the present invention is likewise to reduce the residual error for serial data transmissions protected by means of CRC check data in comparison with the prior art.

In the checking method according to aspects of the invention, serial data protected by means of check data are transmitted via a serial data bus from a transmitter (303) to a receiver (304). The receiver conditions at least some of the data and compares them with the transmitted check data in order to recognize transmission errors. In this case, the conditioning of the data in the receiver and the production of the check data, which are preferably CRC check data, in the transmitter are based on the same check data formation method. The check data formation/conditioning is performed using error recognition hardware means.

On the basis of the method of the invention, an error in the transmitted data and/or check data is caused by a transmitter-end error stimulation means. This allows an improvement in the data transmission security of a serial bus system which, by way of example, uses a conventional, generally used CRC generator polynomial. Although it would likewise be possible to increase the data transmission security by using a more complex CRC polynomial, this would result in an undesirable change to the usual polynomial.

Preferably, the region of the receiver contains not only the error recognition hardware means but also error recognition software means which are used to additionally check the received data. This method step can be used to reduce the residual error mentioned further above and hence to increase the level of security on the serial connection. By way of example, the software means is a software program which carries out an error recognition method which can be used to lower the error rate and hence to further increase the level of security for the transmission at least theoretically.

A quantitative verification or a check on the actual error recognition rate of the additional software function is possible only with difficulty in practice, however. If the region of the receiver contains an error check comprising software and hardware means, an independent test on the reliability and quality of these means during the serial transmission can be performed particularly easily using injected errors by specifically implanting the errors in the data to be transmitted and/or check data. The specific implantation (stimulation) of an error can be effected by an error stimulation means in the transmitter. The error stimulation means is preferably in the form of a hardware element.

On the basis of the method according to aspects of the invention, a data stream to be transmitted can be specifically provided with errors which cannot be recognized by the hardware provided for recognizing errors (for example CRC recognition hardware) at the receiver end. In this way, it is possible, inter alia, to determine the error recognition rate of an additional piece of error recognition software quantitatively. The specific stimulation of such unrecognizable errors also allows the correct operation of the receiver-end error recognition hardware to be checked.

In line with a further preferred embodiment, the method according to aspects of the invention also involves the stimulation of specific errors which, as a result of the recognition hardware in the receiver, are certain to cause an error-assuming error-free transmission. This is a reliable way of recognizing errors in the receiver-end error-test hardware.

The invention also relates to an electronic transmission circuit or a reception circuit. Furthermore, the invention relates to a transceiver (bus node) which comprises both an appropriate transmission circuit and a reception circuit. The invention preferably therefore also relates to a serial data transmission system which contains the above circuit elements, these being particularly in the form such that the method according to aspects of the invention can be carried out using this system.

Finally, the invention also relates to the use of the inventive circuit in motor vehicle controllers, particularly in electronic motor vehicle braking systems or electronic motor vehicle safety systems.

Further preferred embodiments can be found in the description of exemplary embodiments with reference to figures which follows.

BRIEF DESCRIPTION OF THE DRAWINGS

In the figures.

DETAILED DESCRIPTION OF THE PREFERRED EMBODIMENTS

Figure 1:
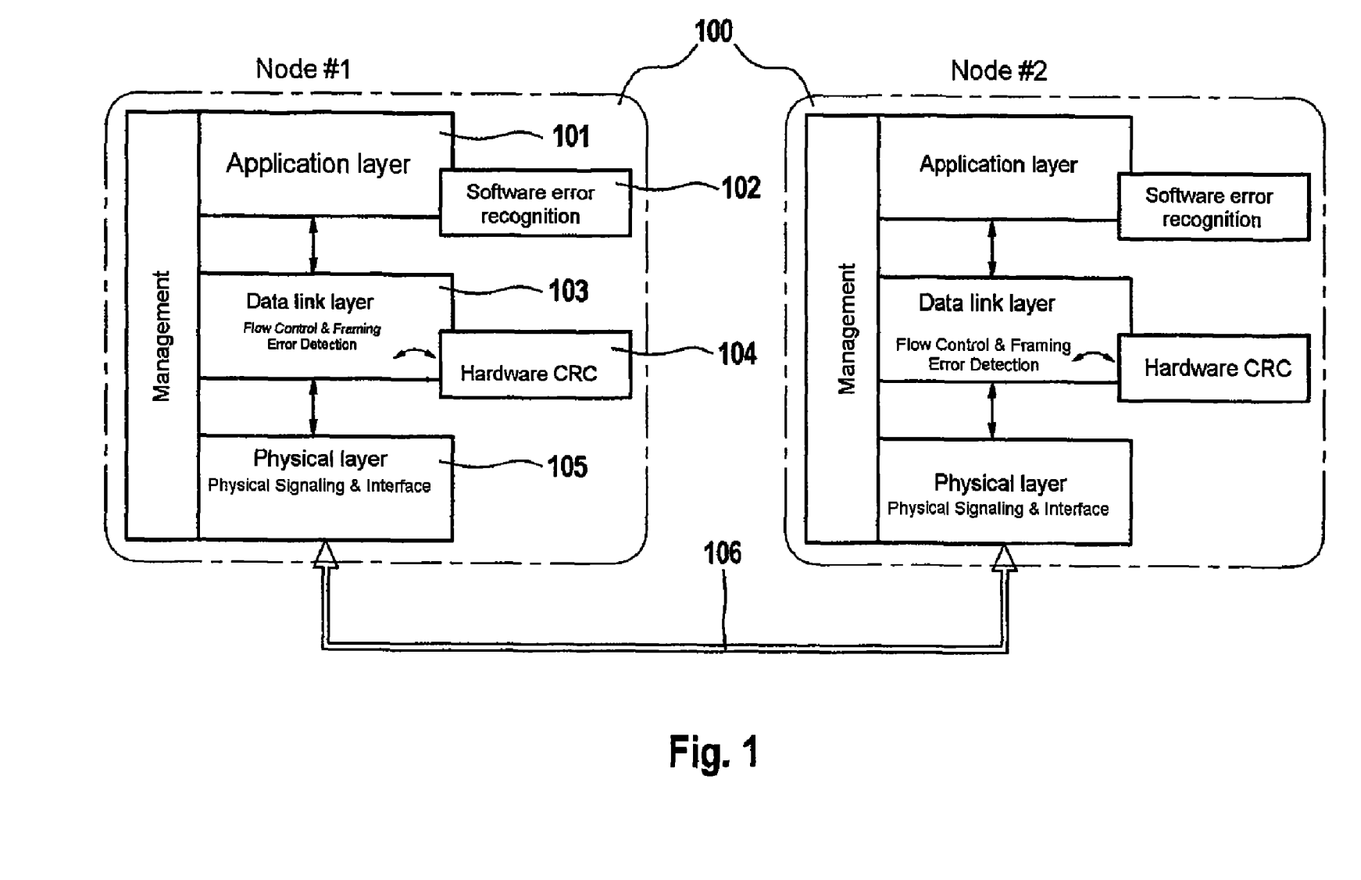
FIG. 1 shows a schematic illustration of two communicating nodes in a standardized bus system.

FIG. 1 shows a schematic block diagram of protocol layers featuring bus nodes 100 which communicate using a standardized serial bus system 106. A bus node comprising a transmitter and a receiver (transceiver) usually comprises a micro-controller and a communication controller for communication. In this case, the communication controller may be integrated in the micro-controller. A node 100 can be assigned three protocol layers:

application layer 101, data link layer 103 and physical layer 105 for transmitting the bits.

The application layer 101 is in the form of a piece of software, whilst the data link layer 103 and the bit transmission layer 105 are depicted in hardware. The CRC calculation and checking take place in the data link layer 103 and are handled in the CRC hardware module 104. A suitably selected CRC polynomial can be used by the CRC hardware module 104 to recognize errors which occur during data transmission on the bus 106 with a high degree of coverage. To achieve a high level of security for the transmission, not only the hardware CRC check but also the software error recognition method 102 are implemented in the application layer 101.

Figure 2:
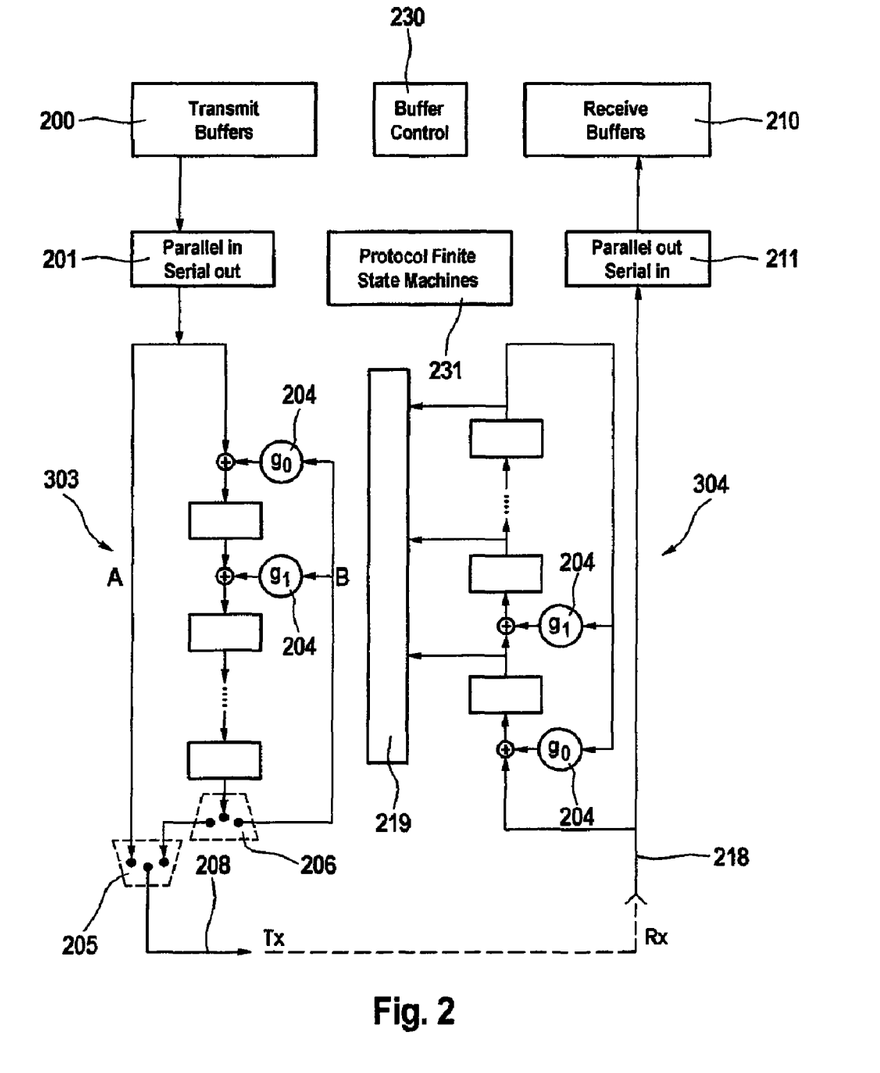
FIG. 2 shows a further schematic illustration of a transmission and reception circuit (bus node) with an illustration of the components required for CRC calculation and checking.

FIG. 2 schematically shows function blocks in an inherently known bus system with a transmitter and a receiver which are required for the CRC calculation and checking. At the transmitter end 303 (see output line Tx), the data bytes belonging to a data telegram are first of all written to the transmission buffer 200. Following parallel/serial conversion in block 201, the bits to be transmitted are forwarded serially through the transmission line TX 208 to the bit transmission layer 105 (FIG. 1) (branch A). During the transmission, the CRC checksum for the transmitted data is calculated in the parallel branch B. To this end, the CRC polynomial is formed by means of shift registers and feedback using the CRC polynomial coefficients 204. When the last databit from a data telegram has arrived in the bit transmission layer 105 (FIG. 1), the multiplexers 205 and 206 are changed over such that the bits of the CRC checksum are also forwarded serially to the bit transmission layer 105.

At the receiver end 304 (see input line Rx), the received serial bit sequence is subjected to serial/parallel conversion and is injected into the data link layer 103. For the received data bits, a CRC checksum is calculated. The comparator 219 establishes whether the calculated and received CRC checksums Match. If there is no match, a transmission error is present. The functional sequence in the transmitter and receiver is controlled by a finite, in particular common, state machine 231. This interacts with buffer controllers 230 in a suitable manner.

Figure 3:
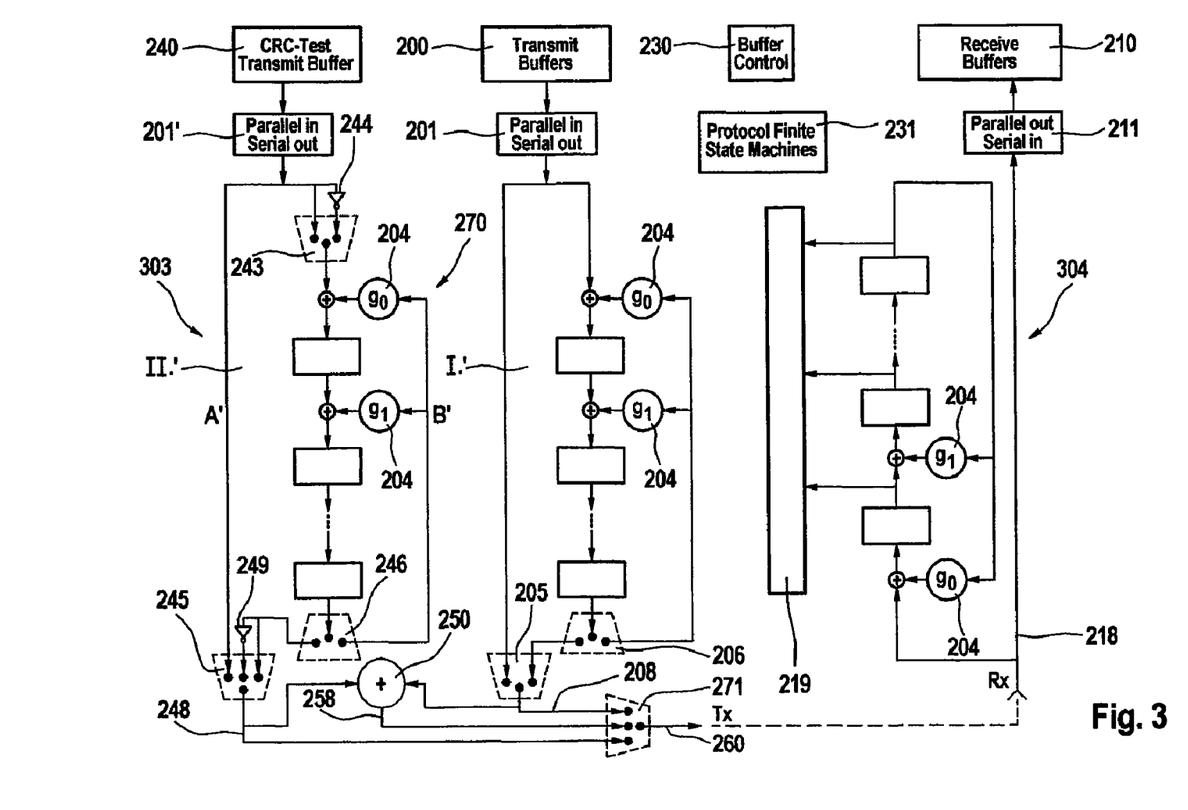
FIG. 3 shows an example of a bus node with increased security which has been extended in comparison with FIG. 2.

At the transmitter end 303 of the bus node shown in FIG. 3, a redundant (dual) path II. is additionally implemented. This redundant path II. comprises a transmission buffer for a CRC test 240, a parallel/serial converter 201' and a dedicated CRC hardware module 270. In the signal path which follows multiplexer 243, the bits to be transmitted can enter the CRC calculation either directly or in negated form via inverter 244. The output line 248 of the redundant CRC calculation path B' is connected with the transmission line 208 of the conventional CRC hardware implementation to the inputs of an XOR gate 250. Output 258 of the XOR gate then forms an additional transmission line. The multiplexer 271 can be used by the control unit for the running protocol to stipulate which output line (208, 248 or 258) is relayed to the transmission line Tx. Output line 258 reflects the theoretical property of CRC checking algorithms according to which XORing two valid CRC codes must also in turn represent a valid CRC code. This output line allows a data telegram to be specifically corrupted such that the hardware CRC check at the receiver end 304 cannot recognize the implanted error.

Error recognition by means of the CRC check in the receiver 304 is not possible for a bit sequence containing transmission errors if the bit sequence is a valid code word of the selected generator polynomial. The function blocks shown in FIG. 3 allow the software-implemented error recognition method 102 to be checked. To be move precise, it is possible to establish whether there are, and the size of, gaps for any errors which cannot be recognized by the CRC hardware. The simulation of an "artificial" error is implemented using the XORing 250 of a stored CRC code word with the bit sequence to be transmitted. This operation is based on the property that the CRC calculation for XORing two code words also delivers a code word of the CRC polynomial under consideration. This stimulation means is implemented essentially in hardware, with a software interface which can be used to indicate the bit positions to be corrupted preferably being provided in addition.

It is now the aim to safely recognize even the implanted errors, which remain undiscovered by the CRC check, using the error recognition method 102, which is in the form of software. If it is not the case, security gaps arise which are difficult to quantify. A further improvement in security is obtained by checking the CRC hardware, particularly the comparator 219, in the receiver itself. If the comparator 219 does not validate the CRC check or validates it incorrectly, the erroneous data sometimes continue to be transmitted unnoticed. For this purpose, the function groups of the circuit shown in FIG. 3 also allow the checksum of a data telegram to be specifically corrupted in the transmitter 303. Accordingly, it is expected that the reception node confirms the recognition of a CRC error in another data telegram. This confirmation then indicates the availability of the CRC check in the reception node. Two options for corrupting the CRC checksum are shown in FIG. 3. A first option involves injecting negated bits into the CRC hardware using the multiplexer 243 and the inverter 244. This option can be used if a bit vector comprising only bits with the logic value "1" is not a valid code for the selected CRC polynomial given a prescribed length. For the second option, the checksum is negated before the transmission. This can be done using the multiplexer 245 and the inverter 249.

Figure 4:
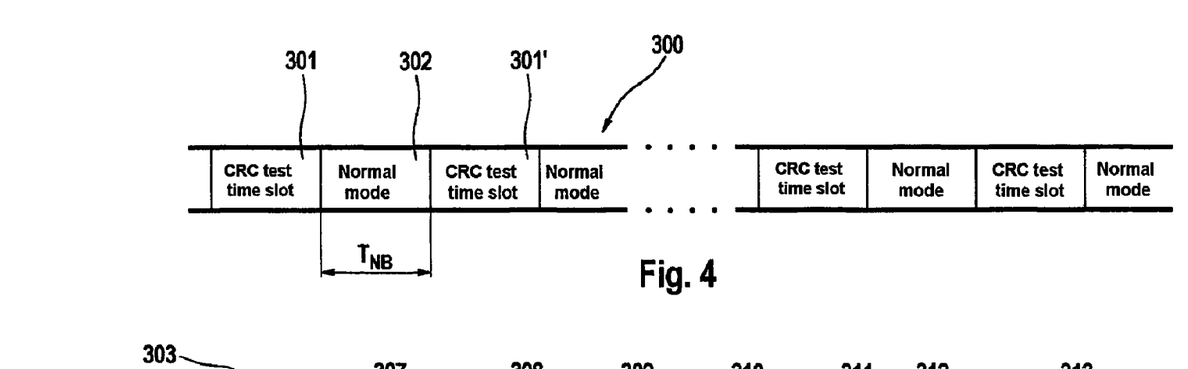
FIG. 4 shows a time sequence to explain the change between test mode and normal mode for an event-controlled protocol such as CAN.

FIG. 4 shows timeslots for implementing CRC tests during a serial transmission, that is to say "online". The data stream 300 has its timing split into equally long units of time length $T_{NB}$ (timeslots for normal mode 302 and test mode 302). It is expedient to provide the timeslots 302 for normal mode such that they are longer than the timeslots 301 so that the transmission rate of the serial bus system is not excessively impaired by the regularly recurring tests.

Figure 5:
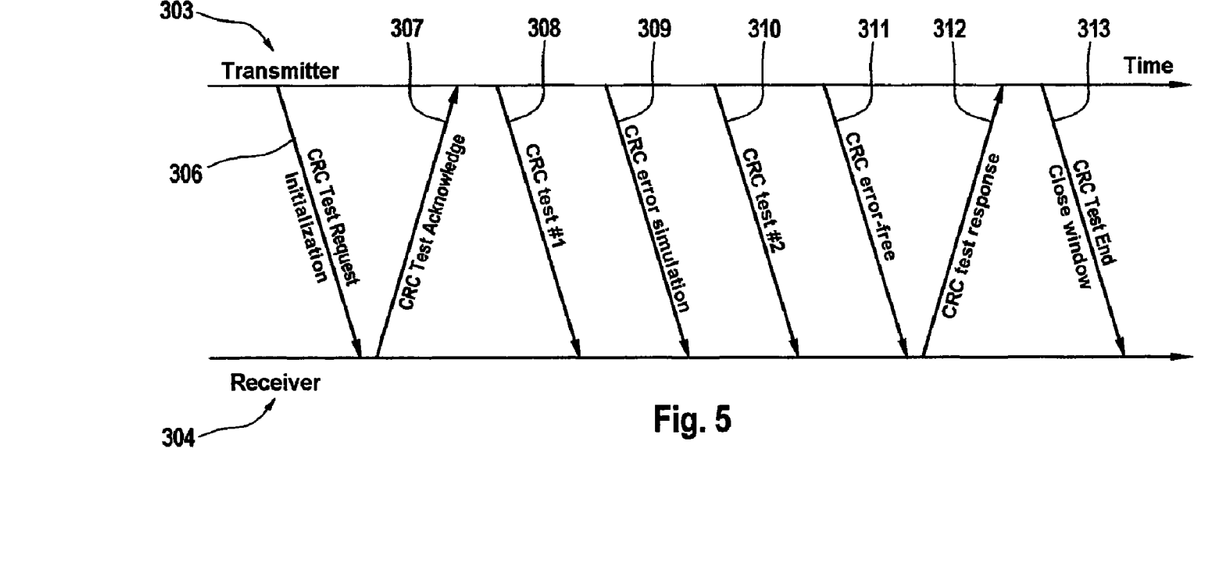
FIG. 5 shows a specific flowchart for the individual steps within the timeslots provided for validation in a method as shown in FIG. 4 in normal mode (online)

FIG. 5 serves to explain the test cycle 301 within the data stream 300 in FIG. 4 in more detail. First, the transmitter 303 sends a special starting code 306 to the receiver 304 which signals the start of the "online" test. Within a bus system having a plurality of bus nodes, precisely one transmitter and one receiver need to have been selected for the test. The receiver 304 selected for the test can use an acknowledgement message 307 to confirm its readiness for the test. Following the acknowledgement message, the checking node 303 sends four data telegrams in succession:

two messages 308 and 310, which each have an erroneous checksum; a message 309 which contains an error which is unrecognizable to the CRC check, and a message 311 which is error-free.

The order of the messages 308, 309 and 310 can be chosen arbitrarily. The fourth message 311 contains a bit pattern which requests a response 312 from the receiver involved in the test. In response to the sequence of test messages, the tested reception node 304 provides a bit pattern 312 which contains a piece of information about the order of the messages 308, 309 and 310. Next, the node 303 sending during the test sends a special message 313 in order to terminate the test process and hence the test timeslot 301. If the response to a request lasts longer than a stipulated time span, the receiver 304 provided for the test terminates the test process. A new test process does not take place again until in the subsequent test timeslot 301' (FIG. 4). The checking node 303 has a device for storing all the errors which have been determined in CRC test timeslots. These can then be read later during servicing work. Preferably, if a lack of availability of the CRC check is determined in at least two successive timeslots then the error is entered into the software running on the checking node under interrupt control, for example. This allows a suitable reaction by the software of the bus node in order to maintain sufficient data integrity.

Besides the above-described encapsulation of the CRC check, it is advantageously possible to keep the likelihood of failed corruption of a CRC sum on account of transmission errors particularly low by sending two different messages with incorrect CRC sums within the CRC checking time window. In this case, particularly the second message is formed as a piece of bit-inverted information from the first message, while the CRC sums from the two messages are interchanged. This refinement can advantageously be incorporated with minimal sophistication into conventional implementations of communication controllers for serial bus systems.

Figure 6:
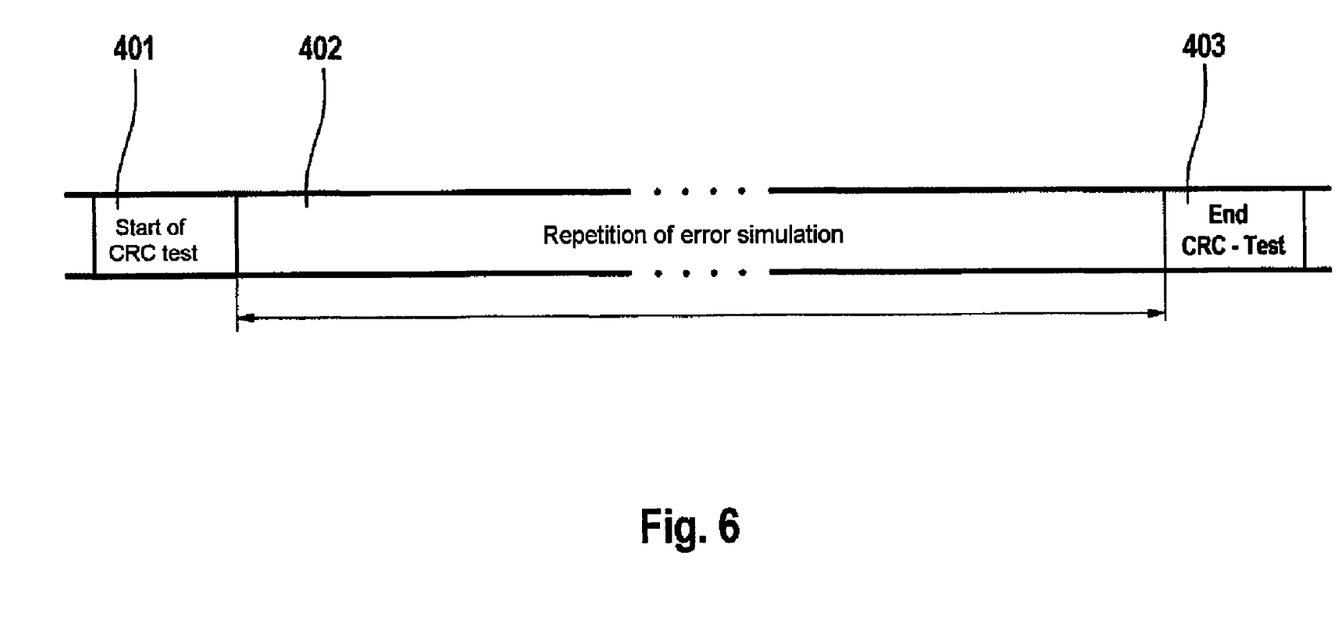
FIG. 6 shows a flowchart for an (intensive) examination of the suitability of a software error recognition method as a security-related addition to the hardware CRC check in test mode (offline)

The text below refers to FIG. 6 in presenting an example of an "offline" method. During the "offline" mode, only tests are performed. During the test, only test data are transmitted. The "offline" mode is used for checking the actual error recognition rate of the error recognition software 102 (FIG. 3). First of all, the transmitter 303 sends a special starting code (timeslot 401) which signals the start of the "offline" check. In the time range 402, exclusively stimulated data errors are transmitted via the serial link. The test is terminated by a special end code (timeslot 403). The "offline" check allows very many more bit packets to be checked in a short time than during a check during ongoing serial data transmission ("online"). In this case too, the specific type of errors stimulated allows the error recognition quality to be checked independently of the hardware recognition of the receiver.

According to one preferred embodiment of the method, the above-described "offline" check is first of all started by stimulating errors with small or extremely small Hamming distances. To this end, the transmitter preferably comprises a means for adjusting the Hamming distance of stimulated errors (e.g. by virtue of a software program, designed for the CRC test, in the testing transmitter). The receiver then checks whether the stimulated error has been detected by the recognition software. If an error has not been detected, there is a checking gap in the error recognition software of the receiver. A particularly expedient search for checking gaps can be performed by first of all producing errors with a small Hamming distance and then progressively increasing the Hamming distance. On account of the very large number of possible errors, it is thus possible to perform meaningful statistical analysis of the frequency of checking gaps. The simulation of rare CRC errors described further above can be used to design software error recognition mechanisms advantageously such that any desired number of incorrect bit positions below a particular threshold value is detected. Depending on the security level sought after, the threshold value can be stipulated as desired.

Figure 7:
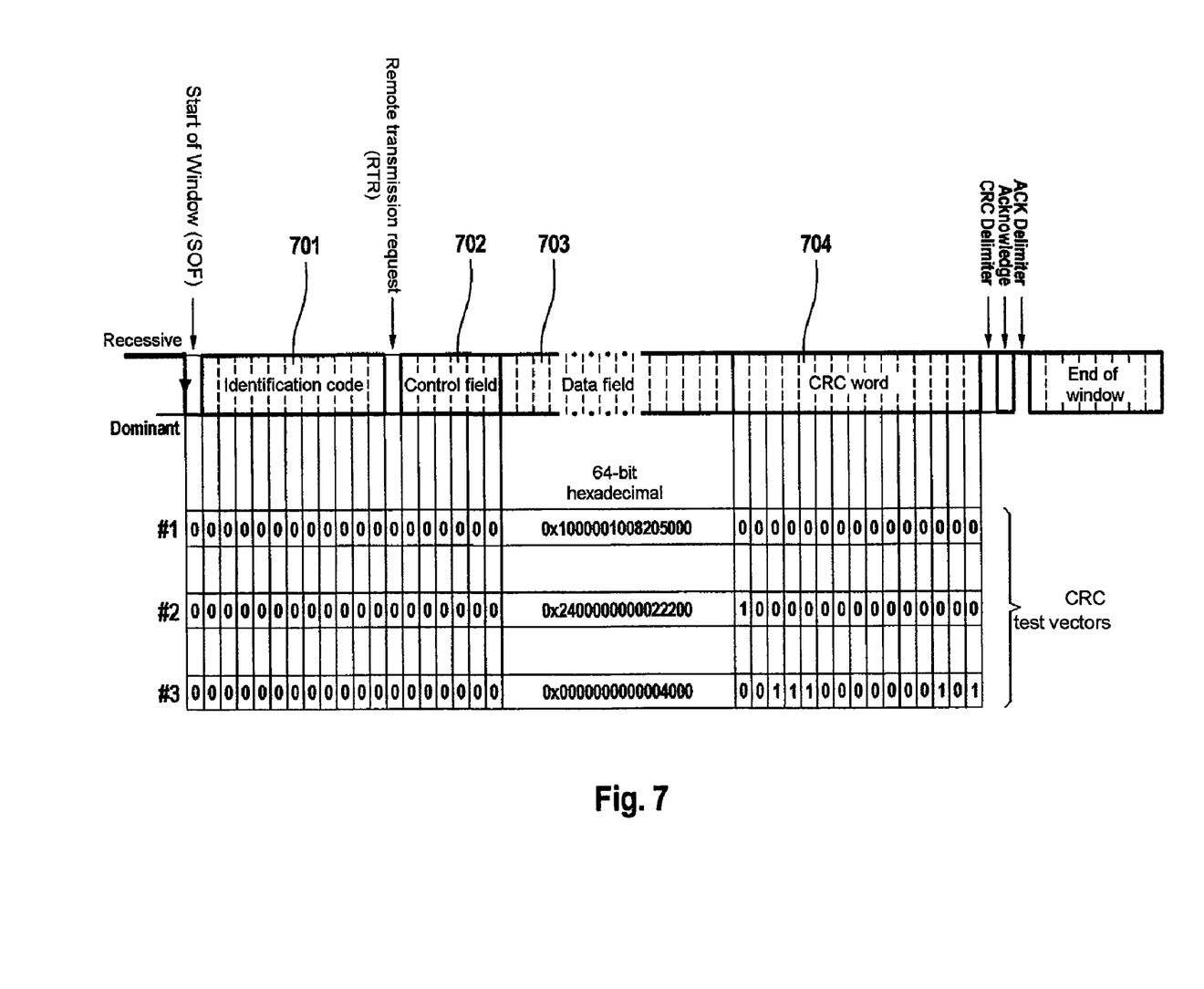
FIG. 7 shows an illustration of the content of a redundant transmission buffer for simulating errors with a Hamming distance of 6 in the event of data transmission via CAN (Controller Area Network)

FIG. 7 shows binary data contents of the CRC test transmission buffer 240 for the example of transmission via a CAN bus. The three bit vectors (#1 to #3) shown are produced (stimulated) such that they stimulate a CRC checking gap with a Hamming distance of 6. In this case, the error stimulation can take place both during an "online" check in accordance with the examples in FIGS. 4 and 5 and also during an "offline" check in accordance with the example in FIG. 6. In the illustrated format of CAN data telegrams, the message identifier 701, the control field 702 and the data field 703 correspond to the content of the CRC test transmission buffer 240. The CRC checkword 704 is calculated for the content of the CRC test transmission buffer 240. A logic value "1" in the CRC test transmission buffer 240 indicates that the relevant bit position in the transmitter buffer 200 is corrupted during the transmission. The bit vector #1 is used to simulate an error only in a data field of 64 bits, whereas the bit vectors also simulate errors in the CRC checkword.

Figure 8:
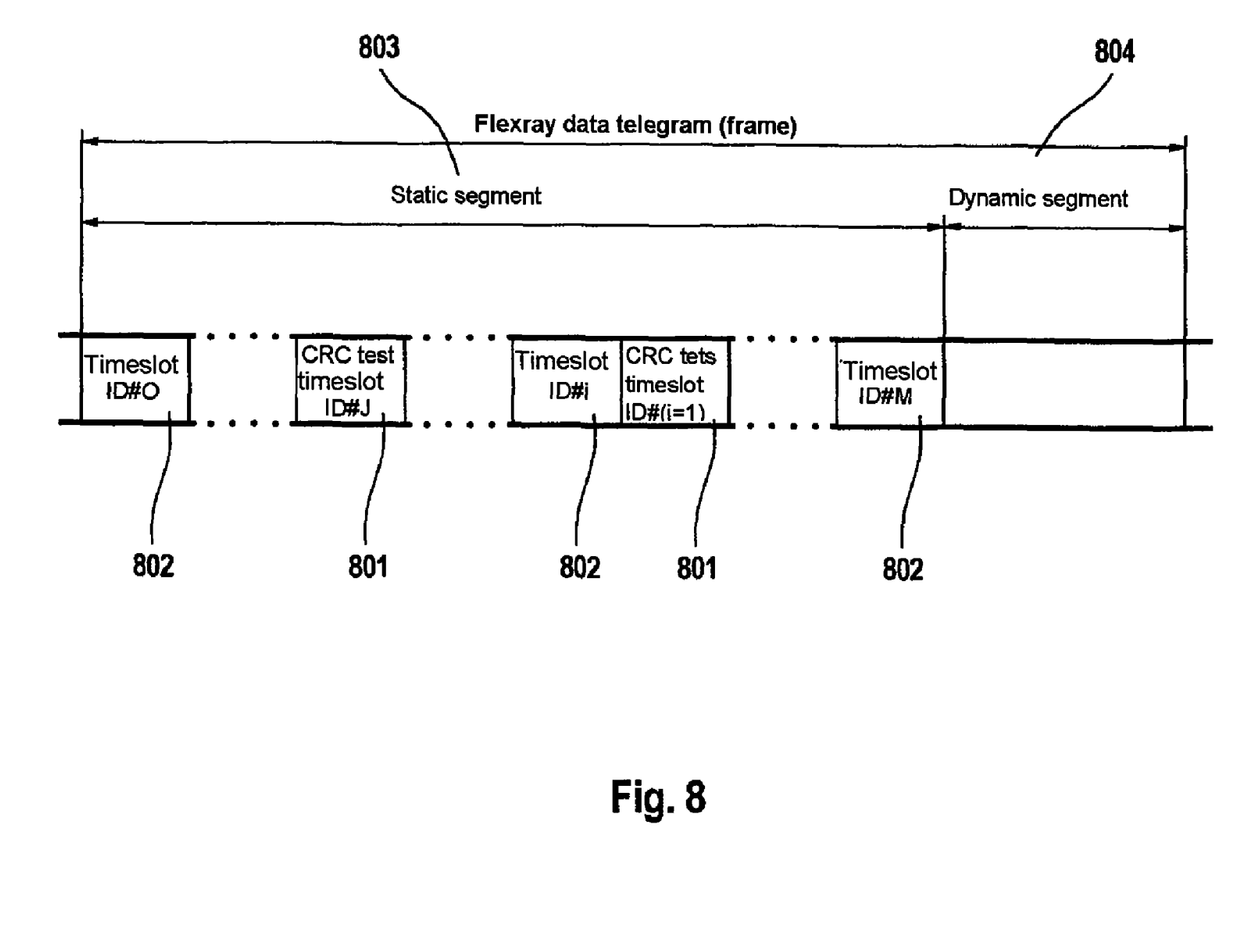
FIG. 8 shows a time sequence to explain the change between test mode and normal mode for a time-controlled protocol, such as Flexray, in the static segment.

In time-controlled protocols, the signaling takes place in timeslots for the CRC "online" check on the basis of a modified form in comparison with the example in FIG. 5. In this case, essentially the steps of "error simulation" 309 and "CRC test response" 312 are performed, these steps occupying different timeslots. To perform the test described here, the testing node alternately incorporates errors into the timeslots provided on the basis of an order which it determines. The responses of the tested node are then intended to reflect the orders of the tests in the timeslots provided. FIG. 8 shows a sequence of CRC test timeslots 801 and the timeslots 802 used in normal mode for the static segment 803 of a Flexray® protocol in order to explain this principle. A Flexray® timeslot 802 is known to be assigned two CRC checksums. One CRC checksum is calculated for the header of the message, while the second CRC checksum relates to useful data for an application. A CRC test timeslot 801 can be reserved either for the error simulation or for a CRC test response. For an "offline" check in the Flexray CRC, a static segment predominantly comprises CRC test timeslots. For the Flexray header the generator polynomial $$x^{11}+x^9+x^8+x^7+x^2+1$$

is applied to a bit sequence of 20 bits. A hexadecimal starting value of "1A" is used to achieve a minimum Hamming distance of 6. In this case, only a small number of error patterns results in a Hamming distance of 6. These error patterns are obtained from XORing one of the following 10 vectors with the 31 bits of a Flexray header which are to be sent, for example:

|  | Null Frame Indicator | Sync Frame Indicator | Frame ID | Payload length | Header CRC |
| --- | --- | --- | --- | --- | --- |
| #1 | 1 | 1 | 01010000000 | 0100100 | 00000000000 |
| #2 | 1 | 0 | 10011100000 | 0000000 | 00001000000 |
| #3 | 1 | 1 | 00001100001 | 0000100 | 00000000000 |
| #4 | 1 | 0 | 01100000000 | 0111000 | 00000000000 |
| #5 | 0 | 0 | 10111000010 | 1000000 | 00000000000 |
| #6 | 0 | 0 | 10100001100 | 0000001 | 00000100000 |
| #7 | 0 | 0 | 10000100000 | 0010000 | 01001000010 |
| #8 | 0 | 0 | 01000000000 | 0100000 | 00011000101 |
| #9 | 0 | 0 | 00010000001 | 0000001 | 00000000111 |
| #10 | 0 | 0 | 00000100000 | 1001000 | 01000100001 |

An "offline" check can be used to check whether a software security layer recognizes all error patterns simulated with a Hamming distance of 6. This makes it possible to ensure that the relevant node transmits the Flexray header with a Hamming distance of 8 and therefore has an increased security level. Similarly, the actual effectiveness of CRC protection can be checked for Flexray useful data.

We claim:

1. A checking method in which serial data protected by check data are transmitted via a serial data bus from a transmitter to a receiver, the method including:
   generating, by the transmitter, the check data based on the serial data;
   combining, by the transmitter, the serial data and the generated check data to form a codeword;
   injecting, by the transmitter, bit errors into the codeword to generate a test word;
   transmitting, from the transmitter to the receiver, the test word;
   checking, by the receiver, the test word for bit errors by sequentially using error recognition hardware and then using error recognition software;
   wherein the transmitter is configured to test:
   i) error detection capabilities of the error recognition hardware by generating the test word such that errors in the test word are detected and corrected by the error recognition hardware to reproduce the codeword, the codeword being transmitted to the error recognition software, and
   ii) error detection capabilities of the error recognition software by generating the test word such that errors in the test word are not detected and not corrected by the error recognition hardware, the uncorrected test word then being transmitted to the error recognition software where the errors are detected and corrected.

2. The method as claimed in claim 1, wherein a malfunction or a fault in the error recognition hardware is recognized in the receiver using the data errors or check data errors.

3. The method as claimed in claim 1, wherein the check data are formed on a basis of a CRC method.

4. The method as claimed in claim 1, wherein the errors are produced by virtue of data to be transmitted being modified by the injecting of the bit errors into the codeword.

5. The method as claimed in claim 1, wherein the error recognition software in the receiver always recognizes CRC data errors which are generated codewords with a Hamming distance below a particular threshold value.

6. An electronic system which comprises:
   a transmitter that generates check data based on the serial data, combines the serial data and the generated check data to form a codeword, injects bit errors into the codeword to generate a test word, and transmits the test word to a receiver that checks the test word for bit errors by sequentially using error recognition hardware and then using error recognition software,
   wherein the transmitter is configured to test:
   i) error detection capabilities of the error recognition hardware by generating the test word such that errors in the test word are detected and corrected by the error recognition hardware to reproduce the codeword, the codeword being transmitted to the error recognition software, and
   ii) error detection capabilities of the error recognition software by generating the test word such that errors in the test word are not detected and not corrected by the error recognition hardware, the undetected test word then being transmitted to the error recognition software where the errors are detected and corrected.

7. The circuit as claimed in claim 6 further comprising transmitter-end changeover means which can be used to change over between: (a) transmitting codewords having injected errors, and (b) transmitting codewords without injected errors.

8. The circuit as claimed in claim 6, wherein the transmitter is provided with a first data conditioning stage including a first check data production circuit, which can be used to forward data and check data without errors to a transmission output, and the transmitter is provided with a second data conditioning stage having a check data production circuit, wherein each data conditioning stage can be used to produce data errors or check data errors.

* * * * *